Apr. 24, 1923.
A. E. SHAW
1,453,194
DENTAL FILM HOLDER
Filed April 26, 1922
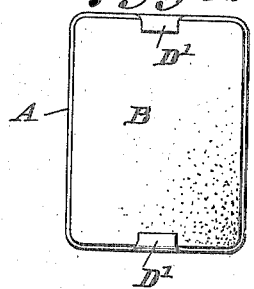
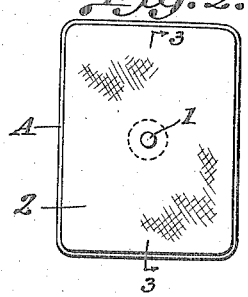
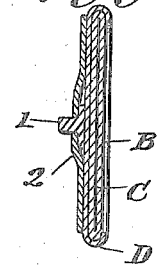
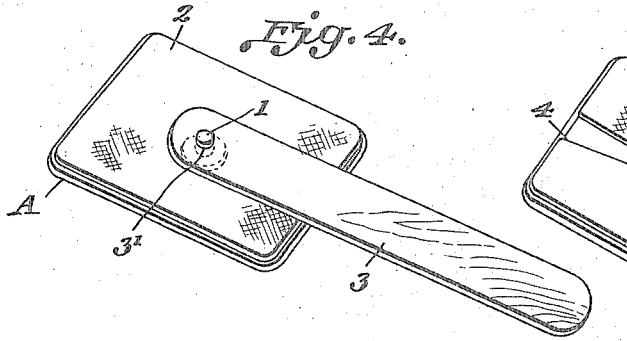
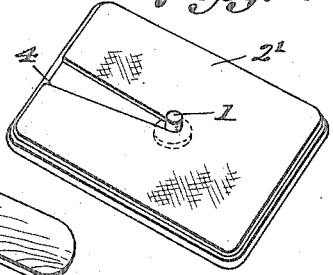
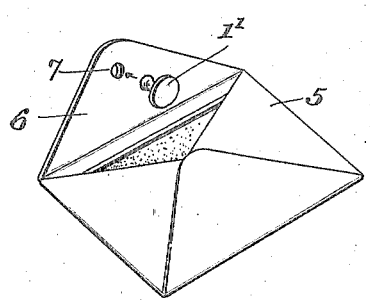
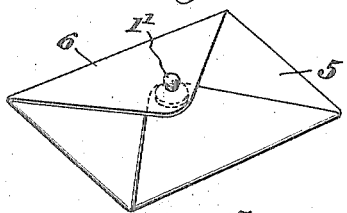
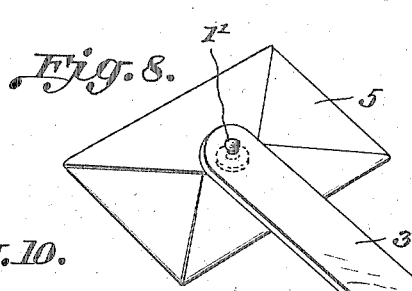
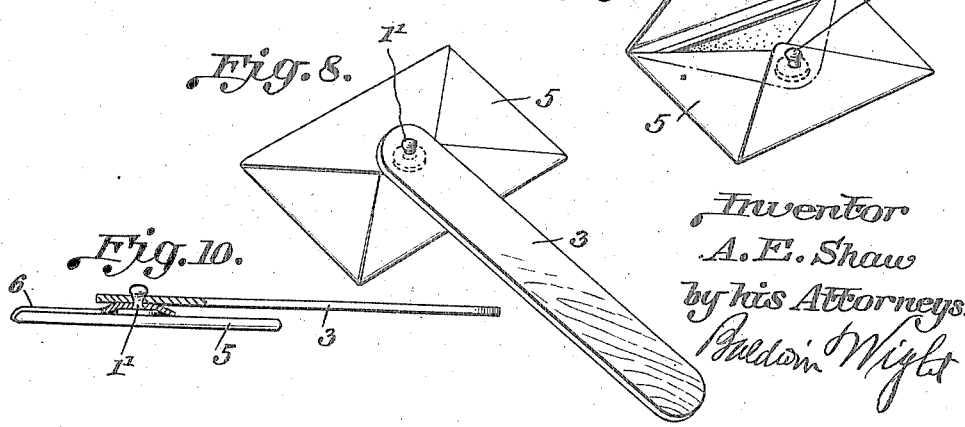
Inventor
A. E. Shaw
by his Attorneys
Baldwin Wight Patented Apr. 24, 1923.

1,453,194

UNITED STATES PATENT OFFICE.

ARTHUR E. SHAW, OF COLUMBIA, SOUTH CAROLINA.

DENTAL FILM HOLDER.

Application filed April 26, 1922. Serial No. 556,687.

*To all whom it may concern:*

Be it known that I, ARTHUR E. SHAW, a citizen of the United States, and resident of Columbia, in the county of Richland and State of South Carolina, have invented certain new and useful Improvements in Dental Film Holders, of which the following is a specification.

In taking skiagraphs of the teeth it has been found more or less difficult to hold the film in proper position so that it can be held against any tooth or portion of the jaw of which a photograph is desired. Many expedients have been tried but as yet none have come into general use.

An object of my invention is to provide a cheap and simple device for holding the films in any desired position that notwithstanding its simplicity will be very effective.

Another object is to provide such a holder that can be used with any form of the X-ray films in general use and the parts of which can be quickly assembled.

Another object is to provide such a holder that can in whole or part be provided with each film and thrown away after one use, thereby avoiding the necessity of sterilizing any parts and at the same time increasing the cost only in a very slight degree.

Other objects will be apparent from the following detailed description of the invention and the appended claims.

In the drawings:

Figure 1 is a front view of one common form of X-ray film pack.

Figure 2 is a rear view of the same showing part of my device applied thereto.

Figure 3 is a section on the line 3—3 of Figure 2.

Figure 4 is a view of the entire device assembled.

Figure 5 is a rear view showing a modification in one element of the device.

Figure 6 is a perspective view of a modification with the parts in one position.

Figure 7 is a similar view of the same modification with the parts of the invention partially assembled.

Figure 8 is a view of the same modification in assembled position.

Figure 9 is a perspective view of a slight modification of the form shown in Figures 6, 7 and 8.

Figure 10 is a section through Figure 8.

One common form of X-ray film pack is shown in Figure 1 and designated A. As shown in section in Figure 3, this pack is composed of one or more thicknesses of paper B, the sensitized plate C and a metal backing D which has its edges turned over at D' (Figure 1) to hold the parts together.

I employ a button 1 of the same general form as a collar button but preferably formed of soft rubber. The base of this button is placed against the back of the film pack. A paper or adhesive cloth member 2 having a hole therethrough for the button 1 is caused to adhere to the back of the film pack A as clearly shown in Figure 3, and holds the button 1 in position. A short piece of wood 3 or similar material is provided with an opening 3' of the proper size to receive the free end of the button. It is intended that the button shall fit snugly in the opening 3' so that the part 3 will serve as a handle. Obviously it will be easy to handle the film pack and place it in any desired position in the mouth beside the selected tooth.

Figure 5 shows how the paper or cloth back 2' may have a slit 4 cut therein to facilitate assembly of the button and back portion. In other respects the device is identical with that already described.

Figures 6 to 10 inclusive show a modification in which a small envelope 5 is employed which is the proper size to hold the film pack. A button 1' corresponding generally to the button 1, although illustrated for variety of slightly different shape, has its small end passed through a hole 7 in the flap 6 as shown in Figure 6. The flap is then turned down and sealed as shown in Figure 7, and the strip or handle 3 can be applied in the usual manner.

A slight variation in this form is shown in Figure 9 wherein the broad base of the button 1' is placed within the envelope and passes through both flap portions thereof. When the handle 3 is applied it holds all parts in assembled position thus avoiding the necessity of sealing down the flap of the envelope.

The handle 3 may be made of wood and thrown away after one use, or it may be made of some other material that can be cleaned and sterilized. While the button 1 is preferably made of soft rubber, it is obvious that other materials may be used without departing from the spirit of the invention. The button element may be one member of a snap fastener and the handle 3 may be provided with the corresponding element instead of merely having an opening therein. The backing or retaining element 2 or 2' may be made of paper or equivalent substance, although I find adhesive tape or cloth very convenient and efficient. It is obvious that the size, proportions and materials may be varied without departing from the invention, which in general is to be regarded as limited only by the scope of the appended claims.

I claim as my invention:

1. A dental film holder comprising a handle, a button member detachably connected thereto, and means for supporting a film pack by said button.

2. A dental film holder comprising a handle, a rubber button member detachably connected thereto, and means operatively connecting a film pack to said button.

3. A dental film holder comprising a rubber button member having a shank and a head portion, a handle detachably engaging the shank and means for connecting a film pack to the head portion.

4. A dental film holder comprising an envelope for containing a film pack, a button having its shank passed through the flap of the envelope, and a handle detachably engaging said shank.

5. A dental film holder comprising an envelope for containing a film pack, a button having its shank passed through one side of the envelope and the flap, and a handle detachably engaging said shank.

In testimony whereof, I have hereunto subscribed my name.

ARTHUR E. SHAW.